Nov. 26, 1929.　　　H. G. KAMRATH　　　1,737,313

GRAVITY FILTER

Filed Sept. 16, 1927

Inventor
Herbert G. Kamrath
By Blackmore, Spencer & Flint
Attorney

Patented Nov. 26, 1929

1,737,313

UNITED STATES PATENT OFFICE

HERBERT GEORGE KAMRATH, OF FLINT, MICHIGAN, ASSIGNOR TO A C SPARK PLUG COMPANY, OF FLINT, MICHIGAN, A COMPANY OF MICHIGAN

GRAVITY FILTER

Application filed September 16, 1927. Serial No. 219,963.

This invention relates to oil filters and particularly to a filter of the gravity type.

In prior filters of this type some difficulty has been experienced in removing the filter bag after it has become clogged or contaminated with the foreign matter in the oil. There has also been some difficulty experienced in securing adequate filtering surface confined to a small space so that sufficient supply of oil may be delivered.

It is an object of the present invention to construct a filter which will provide a readily replaceable filter bag and at the same time provide a large filtering area confined within a relatively small space or container.

The object of the invention is accomplished by providing a container having a bead or rib at its upper edge to form a support for a plate to which the filter bag of the invention is fastened. The plate likewise has a bead in a flanged periphery and to which bead the outer fold of the filter bag is secured. The filter bag is arranged in a plurality of concentric folds, the center fold being secured to a concentrically positioned inlet pipe, while the intermediary folds are secured to the plate by means of fingers or tangs pressed from the plate. The plate is provided with a series of concentric openings to conform to the concentric folds in the filter bag. These openings are for the purpose of allowing the contaminated oil to enter the folds.

The filter is provided with a cover secured to the container preferably by means of the inlet pipe which passes centrally through the container and the cover. The portion of the inlet pipe extending through the cover is threaded and has a nut preferably of the acorn type which closes the opening as well as secures the cover to the filter can.

The invention is disclosed on the accompanying drawing, in which—

Figure 1:
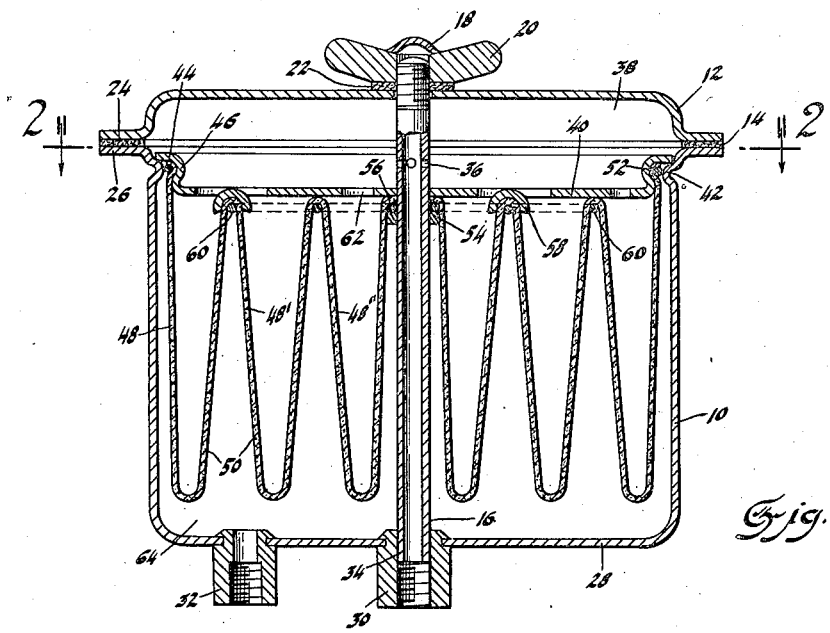
Fig. 1 is a section through the filter taken on the line 1—1 of Fig. 2.

Referring to the numbered parts on the drawing, 10 indicates a filter can having a cover 12. The can or container 10 is shown as round but may be of any suitable shape. A gasket 14 is provided between the cover 12 and can 10 and the parts secured together by means of the inlet pipe or conduit 16, which extends centrally through the filter and projects without the cover as shown at 18. The projecting end is threaded and is provided with a nut 20, preferably of the acorn type which rigidly holds the can 10 and cover 12 together as well as closes the opening in the end 18. A gasket 22 is provided to secure a liquid tight joint.

If desired, means such as screws may be passed through the flanges 24 and 26 of the cover and can respectively to serve as additional means to hold the cover on the can. Such means is optional and is omitted in the preferred form.

A bottom 28 of the can 10 is provided with the inlet port 30 and the outlet port 32. The inlet port 30 has secured thereto the lower end 34 of the pipe 16, while the upper part of the pipe is provided with a plurality of openings 36 to allow for the egress of the oil into the space 38 between the cover 12 and a plate 40. The inlet pipe 16 projects through an opening at substantially the central portion of the plate 40. The fit between the pipe 16 and the opening in the plate is rather tight and is sufficient to hold the plate from rattling.

In the upper portion of the can 10 there is provided a bead or projection 42 extending inwardly from the container and on which rests the peripheral flange 44 of the plate 40. The flange 44 extends somewhat above the plane of the plate 40 and between the flange 44 and the main portion of the plate there is provided the bead or indentation 46 which serves as a means to secure the outer fold 48 of the filter bag 50. This fold is secured by means of the wire 52 which rigidly clamps the edge of the fold within the bead or projection 46.

The bag 50 is arranged in a plurality of concentric folds as shown at 48, 48' and 48". Only three folds are shown for purposes of clearer illustration but as many folds as desired may be used. The innermost fold is secured at its upper portion between the flat central portion of the plate 40 and a collar 54 rigid with the inlet pipe 16. The inner edge of the bag at this point is provided with the grommet 56 to afford a better connection and to prevent wear on the bag.

Figure 2:
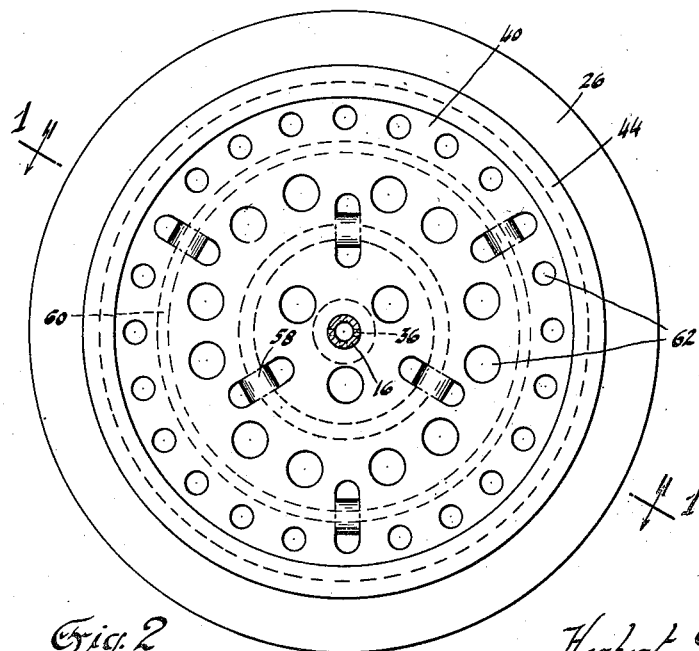
Fig. 2 is a sectional plan view taken on the line 2—2 of Fig. 1.

The intermediary folds are tightly secured to the under surface plate 40 by means of pairs of fingers or tanks 58 pressed downward and toward each other from the body portion of the plate 40. Sufficient metal is left between the tanks to prevent their being readily broken from the plate. At the connecting line of the folds with plate 40 and the tangs 58, rings 60 are provided and by pressing the rings within the space between the tangs they may be snapped into place and confine the filter bag 50 between the plate and ring, and hold it in place by the tangs 58. By referring to Fig. 2 it will be seen that the tangs of successive folds are arranged in staggered relation thereby avoiding an unnecessary weakening of the plate 40. The folds at the ends opposite the rings 60 are not attached and are therefore freely disposed within the filter.

The plate 40 is readily removable and is provided with a series of concentric openings as shown at 62, which openings conform to the concentric folds of the bag 50. The purpose of these openings is to allow the contaminated oil to enter the folds 48 of the bag 50.

To replace the filter bag the nut 20 is unscrewed, which will permit the removal of the cover 12. The plate 40 and its attached filter bag 50 may then be raised from the container and a new unit consisting of a new plate and filter bag may now be placed in the container. If desired, the filter bag 50 may be removed from the old plate 40 and a new filter bag attached. The parts are then replaced in their original position.

In operation the oil is delivered at the inlet port 30, through pipe 16 and out at the openings 36 into the space 38 from where it passes through the plate openings 62 to the folds 48 of the bag. The oil passes through the bag and drips into the space 64 between the bag and container bottom from where it passes out at the outlet port 32.

I claim:

1. In a filter, means for suspending a filtering material from one end so as to maintain it free of the top and bottom of the filter, said filtering material suspended from said means in concentric folds, said means having a plurality of concentric orifices conforming to said folds, and an inlet and an outlet to said filter.

2. In a filter, a member in said filter, a filtering medium, integral, tangs pressed from said member for securing said medium to said member, and inlet and outlet ports to said filter.

3. In a filter, a bead thereon, a plate supported on said bead, a filtering medium arranged in concentric folds in said filter, and means on said plate to secure said medium to said plate.

4. The invention of claim 3, a ring dividing said medium into folds, said means gripping said medium over said ring.

5. The invention of claim 3, a plurality of rings dividing said medium into folds, said means gripping said medium over said rings.

6. In a filter, a supporting ledge thereon, a plate supported on said ledge, a filter bag secured to said plate by means of tangs pressed therefrom, a plurality of rings dividing said bag into a plurality of concentric folds, said plate having a plurality of concentrically arranged holes conforming to the folds of the filter bag, and inlet and outlet ports to said filter.

7. The invention of claim 6, said ledge comprising an inwardly pressed bead.

8. The invention of claim 6, said inlet and outlets being at the same side of the filter and said inlet extending centrally to the opposite side of the filter.

9. The invention of claim 6, said tangs being arranged in staggered relation.

10. In a filter, a container having a plate suspended therein, a filtering medium suspended from said plate, an oil inlet pipe secured at one end of and extending through the container and said filtering medium, a cover for the container at the opposite end, said inlet pipe extending through said cover, and means secured to said inlet to hold said cover on said container.

11. The structure of claim 10, said oil inlet pipe having a delivery passage in the container between the plate and cover.

12. In a filter, a supporting plate freely and removably positioned in said filter, a filtering medium composed of a single piece of fabric arranged in a plurality of concentric folds freely suspended and attached at one end to said plate.

13. In a filter, a supporting plate removably positioned in said filter, said plate having a plurality of openings to permit the passage of a fluid, and a filtering medium composed of a single piece of fabric arranged in a plurality of concentric folds freely suspended at one end and attached to said plate and arranged to receive the fluid to be filtered from said openings.

In testimony whereof I affix my signature.
HERBERT GEORGE KAMRATH.